United States Patent [19]
Short

[11] 3,771,996

[45] Nov. 13, 1973

[54] PROCESS FOR MANUFACTURING GOLD POWDER

[75] Inventor: Oliver A. Short, Wilmington, Del.

[73] Assignee: E. I. du Pont de Nemours and Company, Wilmington, Del.

[22] Filed: Oct. 26, 1971

[21] Appl. No.: 192,611

Related U.S. Application Data

[60] Division of Ser. No. 143,249, May 13, 1971, Pat. No. 3,717,481, which is a continuation-in-part of Ser. No. 820,636, April 30, 1969, abandoned.

[52] U.S. Cl. .................... 75/0.5 A, 75/108, 75/115, 75/118
[51] Int. Cl. ............................................ C22b 11/04
[58] Field of Search ................... 75/0.5 A, 108, 115, 75/118

[56] References Cited
UNITED STATES PATENTS 3,427,153   2/1969   Venkatesan .......................... 75/118
3,620,714   11/1971  Short ................................. 75/0.5 A Primary Examiner—W. W. Stallard
Attorney—James A. Forstner

[57] ABSTRACT

A process for preparing a gold powder having spherical particles with a particle diameter within the range of 1-10 microns wherein the powder has a bulk density within the range of 5-9 gms./cc. by precipitating the gold from solution with selected reducing agents under controlled conditions. Metallizing compositions made from this novel gold fired to very high density prints which have good appearance and electrical properties.

6 Claims, No Drawings

PROCESS FOR MANUFACTURING GOLD POWDER

CROSS-REFERENCE TO RELATED CASES

This is a division of application Ser. No. 143,249, filed May 13, 1971, now U.S. Pat. No. 3,717,461, which application is a continuation-in-part of Ser. No. 820,636, filed Apr. 30, 1969, and now abandoned.

BACKGROUND OF THE INVENTION

Gold powder can be made by many precipitation reactions. For example, chemical reduction from acid solutions may be accomplished by the use of ferrous sulfate or oxalic acid; chemical reduction from alkaline solutions can be accomplished with hydrazine sulfate. In addition, many metals in powder form (e.g., zinc, aluminum or magnesium) will displace gold from its halide solution to produce a gold powder. The gold powder produced by these conventional techniques have nodular or irregular particle shape; none of these prior gold powders have spherical particles of gold.

These nodular gold powders have been used for many years in preparing decorative gold paints as well as printed circuit inks. However, these prior gold powders often fire to form badly fissured prints which have poor electrical properties. There has been a need for a superior gold powder which overcomes these defficiencies. It has been found that the gold powders having a certain shape, size and density offer a solution to this problem. Consequently, this invention involves both a process of producing such gold powders, the gold powders, and printed circuits therefrom.

SUMMARY OF THE INVENTION

This invention relates to a process for preparing a gold powder having spherical particles with a particle diameter within the range of 1–10 microns, said powder having a bulk density within the range of 5–9 gms./cc., comprising:
  a. preparing an aqueous gold chloride solution;
  b. precipitating the gold from solution by rapidly adding an excess amount of a reducing agent selected from the group consisting of potassium sulfite, sodium sulfite and mixtures thereof, while agitating the solution and maintaining the temperature within the range of 0°C. – 30°C.;
  c. separating the precipitated gold powder from the solution; and
  d. washing the precipitated gold powder until the sulfite and sulfate ions have been removed from the powders.

In addition, metallizing compositions comprising the gold powder produced by the above described process are also part of this invention. These gold powders can be combined with an inorganic binder and/or dispersed in an inert liquid vehicle and used to form printed circuits.

DESCRIPTION OF THE PREFERRED EMBODIMENTS

An aqueous gold chloride solution is, of course, a necessary component from which the gold powder is prepared. The aqueous chloride solution may be prepared in any of the conventional and well-known manners. For example, see Sneed et al., Comprehensive Inorganic Chemistry, Vol. II, D. Van Nostrand Co., N. Y., 1954, p. 225. The essential requirement is that the gold is in solution so that is may be precipitated through the use of selected reducing agents.

One of the most important aspects of this invention resides in the use of a reducing agent selected from the group consisting of potassium sulfite, sodium sulfite and mixtures thereof. While many other reducing agents are well known and could be used to precipitate a gold powder, it has been found that under specified conditions, this class of reducing agents precipitates the gold powder of this invention having a specified size, shape and density. The amount of reducing agent utilized is not critical; but to obtain maximum precipitation, an excess is generally used.

Another important feature of this invention involves maintaining the temperature of the solution within the range of 0°C. –30°C. Of course, below 0°C. the solution has a tendency to freeze. Above 30°C., the particles of gold become exceedingly fine and the bulk density becomes too low for purposes of producing good electrical properties. The preferred temperature is within the range of 10°–20°C.

The precipitation (reduction) is performed by adding reducing agent(s) to the aqueous gold chloride solution. The addition of the reducing agent to the gold chloride solution should be carried out as rapidly as possible to provide maximum efficiency of the overall process. It is pointed out that the reducing agent is added to the aqueous gold chloride (not visa versa) to provide gold particles having the proper particle size and shape. For example, the particles become too small when an aqueous gold chloride solution is added to a solution of the reducing agent. Also, although not necessary, it is preferred to agitate the solution while the precipitation reaction takes place. This provides a greater contact between the reducing agent and the gold chloride, and results in a complete precipitation in a shorter period of time.

The process of this invention is not particularly sensitive to the concentration of the reactants. Therefore, concentrated solutions or dilute solutions of the gold chloride and reducing agent may be used. However, somewhat larger particles are obtained when higher concentrations of gold chloride and reducing agent are utilized. Typical and preferred concentrations of gold chloride and reducing agent in their respective solutions are within the ranges of 40–70 gms/liter and 100–200 gms/liter.

The separating step and the washing step are procedures which can be carried out according to well-known techniques. For example, filtration or centrifuging may be used. The washing operation may be carried out by using tap water or distilled water to remove the sulfate and/or sulfite ions from the precipitated gold. A methanol wash may be also used to remove the water from the gold powder.

As stated above, the process of this invention produces a gold powder having spherical particles with a particle diameter within the range of 1–10 microns. The gold powder has a bulk density within the range of 5–9 gms/cc. In a preferred embodiment of this invention the particle size is within the range of 2–6 microns.

The invention is illustrated by the following examples. In the examples and elsewhere in the specification, all parts, ratios and percentages of materials or components are by weight.

EXAMPLE 1

A gold chloride solution was prepared by dissolving 300 grams of metallic gold in aqua regia. By successive boil downs of this solution and with several additions of HCl, the oxides of nitrogen were removed; five liters of water were added to the dissolved gold. In a separate container, 700 grams of potassium sulfite crystals were dissolved in five liters of cold water. Then the gold chloride solution was slowly agitated while the potassium sulfite solution was poured into the gold chloride solution as rapidly as possible. The reaction proceeded very rapidly with no bubbling or frothing. The temperature of the solution was maintained at approximately 20°C.

The reaction was complete in less than one minute. The entire batch was filtered on a sintered glass filter plate and washed with water until the precipitated gold was free of the sulfite and sulfate ions. The gold powder was then washed in methanol to remove the water; the powder was then dried at room temperature.

The gold powder was weighed and found to contain 296 grams of spherical particles; the bulk density was approximately 8.0 gm/cc and the micron size ranged from 2–3 microns.

EXAMPLE 2

A metalizing composition was prepared from the gold powder of Example 1. The composition contained 90.3 percent gold powder, 4.3 percent of a finely divided glass frit, 5.4 percent $Bi_2O_3$. The glass frit consisted of 65% PbO, 34% $SiO_2$ and 1% $Al_2O_3$. The total solids were dispersed in a vehicle consisting of 10 percent ethyl cellulose and 90 percent beta-terpineol. The solids:vehicle ratio was 9:1. The gold composition was printed onto an alumina substrate (One inch square and 25 mils thick) in the form of electrodes which were five mils wide, spaced five mils apart and 0.8 mil thick. The printed substrates were fired at 875°C. for three minutes. The electrodes of the resulting printed circuits were tight opaque lines having good conductivity, a resistivity less than 3 milliohms/square, and were diebondable and wirebondable.

EXAMPLE 3

The gold composition of Example 2 was utilized except that the vehicle consisted of 10 percent hydrogenated rosin, 10 percent ethyl hydroxyethyl cellulose, 19 percent kerosense, 37 percent beta-terpineol, 19 percent of an aliphatic hydrocarbon mixture and 5 percent hydrogenated castor oil. The electrodes, which were printed with an etched metal mask, were 2 mils wide, 2 mils apart and 1 mil thick. The electrodes of this printed circuit were also tight opaque lines having good conductivity, a resistivity less than 3 milliohms/square, and were diebondable and wirebondable.

The spherical gold powders of this invention can be used to prepare various metallizing compositions. In general, conductor compositions containing spherical gold are more useful since a continuous gold film is produced in the ultimate fired structures. However, this does not limit the scope of the invention and the gold powders may also be used in various other metallizing compositions, such as resistor compositions. The metallizing compositions, which contain the gold powder, may be dispersed in an inert vehicle. Additionally, metallizing compositions can also contain a finely divided inorganic binder (e.g., glass, bismuth oxide, cerium oxide, etc.). Any of the conventional components and proportions of ingredients may be included in the metallizing compositions of this invention. For example, see U. S. Pat. Nos. 3,413,240, 3,385,799 and 3,347,799.

In preparing the metallizing compositions, it is desirable although not necessary, to disperse the solids in a vehicle. Any inert liquid may be utilized as a vehicle. Water or any one of various organic liquids, with or without thickening and/or stabilizing, and/or other common additives may be used. Examples of organic liquids that can be used are the aliphatic alcohols; esters of such alcohols, for example, the acetates and propionates; the terpenes, such as pine oil, alpha- and beta-terpineol and the like; solutions of resin such as polymethacrylates of lower alcohols, or solutions of ethyl cellulose, and solvents such as pine oil and the monobutyl ether of ethylene glycol monoacetate. The vehicles of U.S. Pat. No. 3,536,508 may also be used. The vehicle may contain or be composed of volatile liquids to promote fast setting after application; or it may contain waxes, thermoplastic resins or the like materials which are thermofluids so that the vehicle-containing composition may be applied at elevated temperatures to a relatively cold ceramic body upon which the composition sets immediately.

I claim:

1. A process for preparing a gold powder having spherical particles with a particle diameter within the range of 1–10 microns, said powder having a bulk density within the range of 5–9 gms./cc., comprising:
   a. preparing an aqueous gold chloride solution;
   b. precipitating the gold from solution by rapidly adding an excess amount of a reducing agent selected from the group consisting of potassium sulfite, sodium sulfite and mixtures thereof, while agitating the solution and maintaining the temperature within the range of 0°C. – 30°C.
   c. separating the precipitated gold powder from the solution; and
   d. washing the precipitated gold powder until the sulfite and sulfate ions have been removed from the powder.

2. A process in accordance with claim 1 wherein the reducing agent is potassium sulfite.

3. A process in accordance with claim 1 wherein the precipitated gold powder is washed first with water and secondly, with methanol.

4. A process in accordance with claim 1 wherein the temperature in the precipitating step is within the range of 10°–20°C.

5. A process in accordance with claim 1 wherein the particle size of the gold powder is within the range of 2–6 microns.

6. A process in accordance with claim 1 wherein, prior to the precipitating step, the aqueous gold chloride solution contains 40–70 gms/liter of gold and the reducing agent is in a solution containing 100–200 gms/liter of said agent.

* * * * *